United States Patent
Prodan

(10) Patent No.: US 9,432,234 B2
(45) Date of Patent: Aug. 30, 2016

(54) FREQUENCY INTERLEAVING AND DE-INTERLEAVING FOR OFDM MODULATION

(71) Applicant: Broadcom Corporation, Irvine, CA (US)

(72) Inventor: Richard Stephen Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/678,180

(22) Filed: Apr. 3, 2015

(65) Prior Publication Data

US 2015/0295745 A1    Oct. 15, 2015

Related U.S. Application Data

(60) Provisional application No. 61/977,209, filed on Apr. 9, 2014, provisional application No. 62/025,350, filed on Jul. 16, 2014.

(51) Int. Cl.
*H04L 27/28* (2006.01)
*H04L 27/26* (2006.01)
*H04L 5/00* (2006.01)

(52) U.S. Cl.
CPC ....... *H04L 27/2637* (2013.01); *H04L 27/2634* (2013.01); *H04L 27/2647* (2013.01); *H04L 5/0044* (2013.01)

(58) Field of Classification Search
CPC ........... H04L 27/2637; H04L 27/2634; H04L 27/2647; H04L 5/0044
USPC ........................................................ 375/260
See application file for complete search history.

(56) References Cited

U.S. PATENT DOCUMENTS

| | | | | |
|---|---|---|---|---|
| 7,440,510 B2* | 10/2008 | Sandhu | ................. | H04L 1/0071 375/265 |
| 7,460,607 B2* | 12/2008 | van Rooyen | ........... | H04L 1/006 375/265 |
| 7,657,822 B2* | 2/2010 | Shen | .................... | H03M 13/256 375/265 |
| 8,738,990 B2* | 5/2014 | Hill | ....................... | H04L 1/0061 714/758 |
| 2004/0199849 A1* | 10/2004 | Aldridge | ............... | H03M 13/09 714/758 |
| 2004/0258167 A1* | 12/2004 | Powell | .................. | H04L 1/0041 375/259 |
| 2005/0135308 A1* | 6/2005 | Vijayan | ................. | H04L 5/0007 370/330 |
| 2006/0250285 A1* | 11/2006 | Jaffe | ................... | H04B 7/18589 341/60 |

(Continued)

OTHER PUBLICATIONS

LFSR Reference—M-Sequence, Linear Feedback Shift Register, Feedback Taps for Maximal Length Sequences, by New Wave Instruments, Revised on Apr. 5, 2010—Internet Citation—http://www.newwaveinstruments.com/resources/articles/m_sequence_linear_feedback_shift_register_lfsr.htm.*

*Primary Examiner* — Daniel Washburn
*Assistant Examiner* — Berhanu Tadese
(74) *Attorney, Agent, or Firm* — Brinks Gilson & Lione

(57) ABSTRACT

A device implements orthogonal frequency division multiplexing (OFDM) techniques. In particular, the device includes a frequency interleaver and/or de-interleaver for OFDM modulation. The frequency interleaver provides random frequency interleaving for the symbols transmitted by OFDM modulation. The frequency de-interleaver provides random frequency de-interleaving for the symbols received by OFDM demodulation.

20 Claims, 13 Drawing Sheets

(56) References Cited

U.S. PATENT DOCUMENTS

| | | | |
|---|---|---|---|
| 2007/0064831 A1* | 3/2007 | Bjerke | H04L 1/0003 375/267 |
| 2008/0232440 A1* | 9/2008 | Yousef | H04B 1/71 375/148 |
| 2012/0082274 A1* | 4/2012 | Bury | H04L 25/0202 375/346 |
| 2014/0255029 A1* | 9/2014 | Varanese | H04L 27/2626 398/66 |
| 2015/0139351 A1* | 5/2015 | Arambepola | H04L 27/2634 375/295 |

* cited by examiner

300

| 0 | 1 | 2 | .... | 125 | 126 | 127 |

Row Rotation by 2

| 126 | 127 | 0 | .... | 123 | 124 | 125 |

| Read ROW | Column 0 Subcarrier | Write ROW | Column 0 Subcarrier | COLUMN: Rotation: | 0 0 | 1 0 | 2 0 | 3 0 | 4 0 | 5 0 | 6 0 | 7 0 |
|---|---|---|---|---|---|---|---|---|---|---|---|---|
| 0 | 0 | 0 | 0 | | 0 | 1 | 2 | 3 | 4 | 5 | 6 | 7 |
| 1 | 8 | 1 | 8 | | 8 | 9 | 10 | 11 | 12 | 13 | 14 | 15 |
| 2 | 16 | 2 | 16 | | 16 | 17 | 18 | 19 | 20 | 21 | 22 | 23 |
| 3 | 24 | 3 | 24 | | 24 | 25 | 26 | 27 | 28 | 29 | 30 | 31 |
| 4 | 32 | 4 | 32 | | 32 | 33 | 34 | 35 | 36 | 37 | 38 | 39 |
| 5 | 40 | 5 | 40 | | 40 | 41 | 42 | 43 | 44 | 45 | 46 | 47 |
| 6 | 48 | 6 | 48 | | 48 | 49 | 50 | 51 | 52 | 53 | 54 | 55 |
| 7 | 56 | 7 | 56 | | 56 | 57 | 58 | 59 | 60 | 61 | 62 | 63 |

Figure 9

| Read ROW | Column 0 Subcarrier | Write ROW | Column 0 Subcarrier | COLUMN: Rotation | 0 0 | 1 0 | 2 0 | 3 0 | 4 0 | 5 0 | 6 0 | 7 0 |
|---|---|---|---|---|---|---|---|---|---|---|---|---|
| 0 | 0 | 0 | 0 | 0 | 0 | 1 | 2 | 3 | 4 | 5 | 6 | 7 |
| 1 | 40 | 6 | 8 | 6 | 47 | 40 | 41 | 42 | 43 | 44 | 45 | 46 |
| 2 | 56 | 3 | 16 | 3 | 62 | 63 | 56 | 57 | 58 | 59 | 60 | 61 |
| 3 | 16 | 5 | 24 | 5 | 21 | 22 | 23 | 16 | 17 | 18 | 19 | 20 |
| 4 | 48 | 7 | 32 | 7 | 52 | 53 | 54 | 55 | 48 | 49 | 50 | 51 |
| 5 | 24 | 1 | 40 | 1 | 27 | 28 | 29 | 30 | 31 | 24 | 25 | 26 |
| 6 | 8 | 4 | 48 | 4 | 10 | 11 | 12 | 13 | 14 | 15 | 8 | 9 |
| 7 | 32 | 2 | 56 | 2 | 33 | 34 | 35 | 36 | 37 | 38 | 39 | 32 |

| Read ROW | Column 0 Subcarrier | Write ROW | Column 0 Subcarrier | COLUMN: | 0 | 1 | 2 | 3 | 4 | 5 | 6 | 7 |
|---|---|---|---|---|---|---|---|---|---|---|---|---|
| | | | | Subcarrier Rotation: | 2 | 4 | 1 | 7 | 5 | 3 | 6 | 0 |
| 0 | 0 | 0 | 0 | | 10 | 53 | 35 | 42 | 17 | 24 | 60 | 7 |
| 1 | 40 | 6 | 8 | | 33 | 28 | 2 | 57 | 48 | 15 | 19 | 46 |
| 2 | 56 | 3 | 16 | | 0 | 11 | 41 | 16 | 31 | 38 | 50 | 61 |
| 3 | 16 | 5 | 24 | | 47 | 34 | 56 | 55 | 14 | 5 | 25 | 20 |
| 4 | 48 | 7 | 32 | | 62 | 1 | 23 | 30 | 37 | 44 | 8 | 51 |
| 5 | 24 | 1 | 40 | | 21 | 40 | 54 | 13 | 4 | 59 | 39 | 26 |
| 6 | 8 | 4 | 48 | | 52 | 63 | 29 | 36 | 43 | 18 | 6 | 9 |
| 7 | 32 | 2 | 56 | | 27 | 22 | 12 | 3 | 58 | 49 | 45 | 32 |

| # Subcarriers | 3745 |
|---|---|
| # Rows | 64 |
| # Columns | 59 |
| Last Column | 33 |

1302

| Read ROW | Column 0 Subcarrier | Write ROW | Column 0 Subcarrier | COLUMN: | 0 | 1 | 2 | 3 | 4 | 5 | 6 | 7 | 8 |
|---|---|---|---|---|---|---|---|---|---|---|---|---|---|
|  |  |  |  | Rotation: | 44 | 4 | 52 | 22 | 38 | 14 | 62 | 26 | 42 |
| 0 | 0 | 0 | 0 |  | 390 | 350 | 283 | 2944 | 3020 | 2821 | 2870 | 3186 | 3262 |
| 1 | 1930 | 48 | 59 |  | 2319 | 2162 | 2212 | 1130 | 1089 | 1007 | 939 | 1372 | 1331 |
| 2 | 2866 | 24 | 117 |  | 3254 | 3097 | 3147 | 3410 | 3486 | 3287 | 3336 | 201 | 160 |
| 3 | 936 | 40 | 176 |  | 1323 | 1283 | 1216 | 1596 | 1555 | 1473 | 1405 | 2013 | 2089 |
| 4 | 3334 | 12 | 234 |  | 152 | 1 | 3731 | 659 | 618 | 536 | 468 | 2948 | 3024 |
| 5 | 1404 | 60 | 293 |  | 2081 | 1930 | 1799 | 2471 | 2547 | 2348 | 2456 | 1134 | 1093 |
| 6 | 468 | 20 | 351 |  | 3016 | 2924 | 862 | 72 | 3658 | 3517 | 3625 | 3414 | 3490 |
| 7 | 2398 | 36 | 410 |  | 1085 | 993 | 2791 | 1884 | 1843 | 1703 | 1694 | 1600 | 1559 |
| 8 | 3568 | 6 | 468 |  | 3482 | 3390 | 392 | 2819 | 906 | 766 | 757 | 663 | 622 |
| 9 | 1638 | 54 | 527 |  | 1551 | 1459 | 2321 | 1005 | 2718 | 2578 | 2686 | 2475 | 2551 |
| 10 | 702 | 30 | 585 |  | 614 | 522 | 3256 | 3285 | 436 | 296 | 287 | 76 | 3662 |
| 11 | 2632 | 46 | 644 |  | 2543 | 2451 | 1325 | 1471 | 2248 | 2108 | 2216 | 1888 | 1847 |
| 12 | 234 | 10 | 702 |  | 3654 | 3620 | 154 | 534 | 3183 | 3043 | 3151 | 2823 | 910 |
| 13 | 2164 | 58 | 761 |  | 1839 | 1689 | 2083 | 2346 | 1369 | 1229 | 1220 | 1009 | 2722 |
| 14 | 3100 | 18 | 819 |  | 902 | 752 | 3018 | 3515 | 198 | 5 | 3735 | 3289 | 440 |
| 15 | 1170 | 34 | 878 |  | 2714 | 2681 | 1087 | 1701 | 2010 | 1934 | 1803 | 1475 | 2252 |

FREQUENCY INTERLEAVING AND DE-INTERLEAVING FOR OFDM MODULATION

PRIORITY CLAIM

This application claims priority to provisional application Ser. No. 61/977,209, filed Apr. 9, 2014, and provisional application Ser. No. 62/025,350, filed Jul. 16, 2014, which are entirely incorporated herein by reference.

TECHNICAL FIELD

This disclosure relates to data transmission. This disclosure also relates to orthogonal frequency division multiplexing techniques for data transmission.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. The connections between device on the network take many forms, including wireless links such as 802.11n links, and wired links such as Ethernet cable and coaxial cable links. The coaxial cable links may adhere to the Data Over Cable Service Interface Specification (DOCSIS).

BRIEF DESCRIPTION OF THE DRAWINGS

FIG. 9 shows an example of data that may be generated during a frequency interleaving process.

FIG. 10 shows an example of data that may be generated during a frequency interleaving process.

FIG. 11 shows an example of data that may be generated during a frequency interleaving process.

FIG. 13 shows an example of data (partial) that may be generated during a frequency interleaving process.

DETAILED DESCRIPTION

Figure 1:
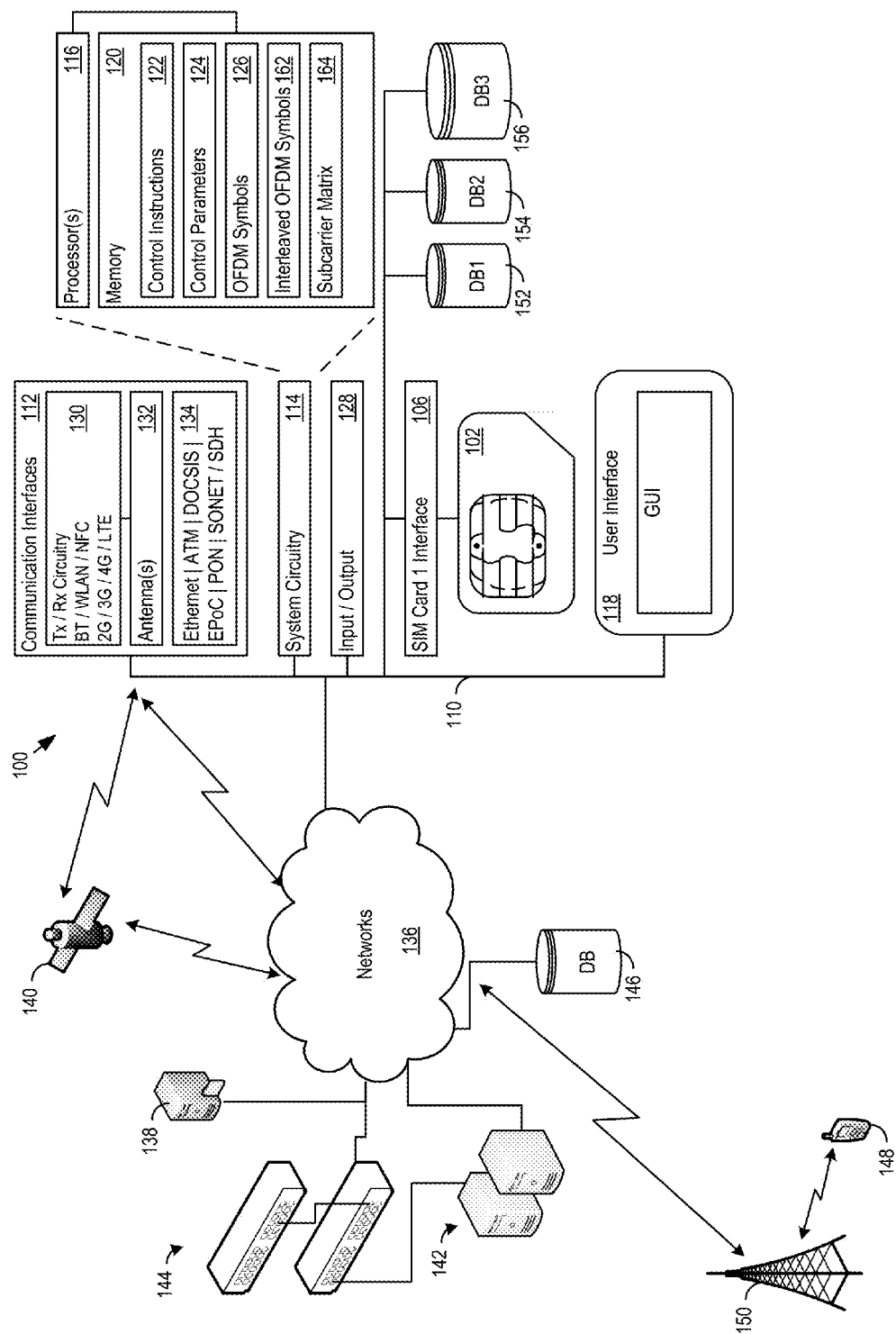
FIG. 1 shows an example of a system that may employ frequency interleaving for orthogonal frequency division multiplexing (OFDM) symbols, e.g., in connection with DOCSIS based communication.

Currently, many standardized communications are moving to adopt orthogonal frequency division multiplexing (OFDM) technology as a way to increase capacity and reliability in wireless and wire line data communications. OFDM is a multi-carrier or multi-tone modulation technique in which individual subcarriers or tones, which are very closely spaced in frequency, are modulated with data to be communicated. In one example, subcarrier spacing is 50 kHz but any suitable value may be used. The respective subcarriers are harmonically related so that they are mutually orthogonal. This is accomplished using an inverse discrete fast Fourier transform (FFT) where each individual subcarrier is modulated using a conventional digital modulation scheme at a low symbol rate. OFDM is used for communicating symbols of data by a transmission circuit to a remote receiver circuit. The symbols are modulated, such as by quadrature amplitude modulation (QAM). Upon receipt of data to be communicated by the transmission circuit, each QAM symbol of the data to be communicated is assigned to a subcarrier of an FFT.

For example, at baseband, the data is forward error correction (FEC) encoded into a sequence of code words for transmission to one or more receivers over a channel. Each symbol to be communicated may include any number of code words, such as six. A set number of bits, such as the first two bits in a symbol, are assigned to a first carrier; the next two bits are assigned to a second carrier, etc. The number of bits assigned to each subcarrier depends on the fidelity of the channel and may be any suitable number of bits per subcarrier. This subcarrier assignment process continues until all available subcarriers have been assigned or all received data for transmission has been accommodated. In an exemplary system, 3,840 subcarriers, at 10 bits per subcarrier, are available and a code word occupies approximately 30 MHz of a 200 MHz transmission bandwidth. An inverse FFT is performed to transform from the frequency domain to the time domain. Some further signal conditioning and error correction is performed on the data. The symbol is then transmitted over the channel as an apparently random or noise-like time domain waveform having a relatively flat spectrum.

A problem may arise in the presence of interference if the data to be transmitted is assigned to subcarriers that are located adjacently, spaced closely in the spectrum, and all belonging to the same code word. In the event of interference on the channel, such as a burst of radio frequency energy with energy in the band assigned to the subcarriers, the interference can be centered on a single code word and disrupt or prevent communication of that code word, or multiple adjacent code words. This is even true in a wire line system, where the channel includes a coaxial cable, as in a system supporting Data Over Cable Service Interface Specification (DOCSIS). The result due to the interference may be reduced data throughput, as corrupted symbols or code words need to be retransmitted. Or, the result may be lost or corrupted data if the error cannot be corrected. Error correction algorithms will allow correction of some errors, for example up to 10 or 12 percent of transmitted data. However, bursty interference that is localized in frequency may disrupt larger amounts of data than can be readily corrected.

An improvement to performance and reliability is provided by relocating the data to be transmitted on the subcarriers so that the data in each codeword is spread throughout the transmission spectrum. In accordance with some embodiments, the subcarriers may be interleaved so that the data to be transmitted is generally randomized in order and spread across a larger portion or even all of the transmission bandwidth, 200 MHz in the example. Then a frequency-localized interferer will affect more code words or even all code words, but to a lesser extent so that the forward error correction algorithm can correct the errors due to the interferer.

Referring now to the drawing, FIG. 1 shows an example of a system 100. In one example, the system 100 may include or form a Coaxial Line Terminal (CLT), that may employ frequency interleaving for orthogonal frequency division multiplexing (OFDM) symbols, e.g., in connection with DOCSIS based communication. The system 100 may be implemented in a cable modem, in a network interface card in, e.g., a desktop computer, laptop computer, or tablet computer, or in a DOCSIS networking device, such as a switch, router, or hub, as just a few examples. The techniques described herein regarding frequency interleaving may be implemented in a wide array of different types of devices.

Accordingly, the system example described below provides just one example context for explaining the frequency interleaving techniques.

The system 100 includes communication interfaces 112, system circuitry 114, a user interface 118 and input and output (I/O) interface 128. The system circuitry 114 may include any combination of hardware, software, firmware, or other circuitry. The system circuitry 114 may be implemented, for example, with one or more systems on a chip (SoC), application specific integrated circuits (ASIC), discrete analog and digital circuits, and other circuitry.

The system circuitry 114 is part of the implementation of any desired functionality in the system 100, such as network communication over coaxial cable connections. As some examples the system circuitry 114 may perform functions including set up, maintain, and tear down network connections; format, encode or decode, and transmit and receive data over the network connections. The system circuitry 114 may run applications; accept user inputs; save and retrieve application data; establish, maintain, and terminate cellular phone calls or data connections for, as one example, Internet connectivity; establish, maintain, and terminate wireless network connections, Bluetooth connections, or other connections; and display information on the user interface 118, such as processed images.

The user interface 118 and the (I/O) interface 128 may include a graphical user interface, a touch sensitive display, voice or facial recognition inputs, buttons, switches, speakers and other user interface elements. Additional examples of the I/O interface 128 include microphones, video and still image cameras, temperature sensors, vibration sensors, rotation and orientation sensors, headset and microphone input and output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The I/O interface 128 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The communication interfaces 112 may include transceivers 134 for wired or wireless communication. The transceivers 134 may include modulation or demodulation circuitry, digital to analog converters (DACs), shaping tables, analog to digital converters (ADCs), filters, waveform shapers, filters, pre-amplifiers, power amplifiers or other circuitry for transmitting and receiving through a physical (e.g., wireless or wireline) medium such as coaxial cable, Ethernet cable, or a telephone line, or through one or more antennas. In the example of FIG. 1, the system 100 supports one or more Subscriber Identity Modules (SIMs), such as the SIM1 102 to further support data communications over cellular networks. An electrical and physical interface 106 connects SIM1 102 to the rest of the user equipment hardware, for example, through the system bus 110. Radio Frequency (RF) transmit (Tx) and receive (Rx) circuitry 130 handles transmission and reception of signals through one or more antennas 132, e.g., to support Bluetooth (BT), Wireless LAN (WLAN), Near Field Communications (NFC), and 2G, 3G, and 4G Long Term Evolution (LTE) communications and other wireless communications, whether according to a published standard or not.

The transceivers 134 may include electrical and optical networking transceivers. Examples of electrical networking transceivers include coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

The system 100 may receive network data through the networks 136 including, e.g., the Internet, or other local area networks (LAN) or wide area networks (WAN), whether private or public, from many different sources. Similarly, the system 100 may transmit network data through the networks 136 to many different destinations. Examples of sources and destinations include file servers 138; communication satellites 140; computer systems 142; network devices 144 such as switches, routers, and hubs; and remote databases 146; as well as mobile devices 148 connected, e.g., through cellular base stations 150. The system may access local databases as well, such as the databases 152, 154, and 156.

The system circuitry 114 may include one or more processors such as processor 116 and one or more memories such as memory 120. The memory 120 stores, for example, control instructions 122 that the processor 116 executes to carry out desired functionality for the system 100, such as interleaving OFDM symbols 126 to generate an interleaved OFDM symbol stream 162 that is transmitted by one or more of the transceivers 134. Or, the memory 120 stores control instructions 122 that the processor 116 executes for de-interleaving a received interleaved OFDM symbol stream 162 into OFDM symbols 126.

The memory 120 in the illustrated example also stores control parameters 124. The control parameters 124 provide and specify configuration and operating options for the control instructions 122. The control parameters 124 may specify, e.g., the dimensions of the memory that stores subcarrier identifiers, the configuration of a Linear Feedback Shift Register (LFSR) maintained in the memory or elsewhere in the system circuitry that generates addresses into the memory, the conditions under which the LFSR is clocked to generate addresses, and other parameters of the frequency interleaving techniques described below.

Frequency Interleaving

Some frequency interleaving methods, systems, processes, and devices are described in U.S. Provisional Application No. 61/977,209, filed on Apr. 9, 2014, the entirety of which is incorporated herein by reference. Further, some frequency interleaving and de-interleaving methods, systems and processes and devices are described in U.S. provisional application Ser. No. 62/025,350, filed Jul. 16, 2014, the entirety of which is incorporated herein by reference. The system circuitry 114 may implement any of the methods, systems, techniques, and devices disclosed in Application No. 61/977,209 or in Application No. 62/025,350 taken alone or together, in combination or as an alternative to any of the present disclosure.

The system circuitry 114 may be part of a Coaxial Line Terminal (CLT) that implements a frequency interleaver. The frequency interleaver may frequency interleave OFDM symbols, e.g., after time interleaving of the symbols. The system circuitry 114, the transceivers in the communication interfaced 112, or both, may implement frequency interleaving. In other embodiments, the frequency interleaving may be performed by any suitable circuitry, software, or combination of the two.

When implemented in a CLT, the CLT performs frequency interleaving after time interleaving; subcarriers containing continuous pilots, excluded subcarriers, or physical (PHY) Link data are not frequency interleaved. The frequency interleaver may be implemented by any suitable combination of hardware and software, such as a processor operating in conjunction with a memory storing data and instructions, and works on individual OFDM symbols. Each symbol to be interleaved consists of $N_I$ subcarriers indexed from 0 to $N_I-1$ in ascending frequency order. These $N_I$ subcarriers are made up of $N_D$ data subcarriers and $N_S$ scattered pilot placeholders.

The frequency interleaver may change the frequency locations of individual OFDM subcarriers in one or more OFDM symbols. The aim of frequency interleaving may be to disperse ingress that affects a number of consecutive subcarriers in a consecutive OFDM symbol. The ingress may be radio frequency interference of a continuous or bursty nature. It may be due to regulated communication, such as a transmission by a long-term evolution (4G LTE) radio, or it may be due to unregulated environmental noise having relatively random duration, frequency and signal power. Such ingress may operate to corrupt subcarriers of one or more OFDM symbols on a channel formed by the system circuitry 114 and transmitted by a transceiver of the transceivers 134.

Frequency interleaving may distribute the burst-affected subcarriers over a number of low-density parity check (LDPC) code words, for example. The following disclosure may provide for frequency interleaving of OFDM symbols with a low implementation complexity and storage. Frequency interleaving of the subcarriers in OFDM symbols may occur independently before, during, or after OFDM symbols have been time interleaved. Time interleaving may be implemented in any suitable manner, including with a convolutional time interleaver of the subcarriers in the sequence of OFDM symbols.

The frequency interleaver implemented by the system circuitry 114 may operate on individual OFDM symbols. An OFDM symbol to be interleaved may include $N_I$ subcarriers, for example indexed from 0 to $N_I-1$. The $N_I$ subcarriers may comprise $N_D$ data subcarriers and $N_S$ scattered pilot placeholders. Although $N_D$ and $N_S$ need not be the same for every symbol, the value of $N_I$ may be constant for all OFDM symbols in a given system configuration. The subcarriers of a respective symbol are transmitted concurrently in time. In an exemplary system, every 20 µs an FFT operation is performed to assign 3840 carriers to the symbol and the symbol is transmitted.

To effectively randomize the data of the subcarriers, the data are written into a two-dimensional store or data block by the system circuitry. In an example, the store has 64 rows by K columns. K is selected based on the number of subcarriers being used to transmit the symbol.

The memory 120 (or other storage area) may hold a subcarrier matrix 164. The subcarrier matrix 164 may be implemented as a two dimensional array, e.g., of $2^L$ rows and K columns, where L and K may be configured or chosen depending on the size of the Fast Fourier Transform operation used for creating the OFDM symbols. As one example, values of L and K that result in approximately the same number of rows and columns in the subcarrier matrix 164 may work well. If the number of data subcarriers and scattered pilots in the OFDM symbol is $N_I$, then the number of columns, K, is given by the following equation:

$$K = \text{ceil}\left(\frac{N_I}{2^L}\right)$$

In the equation above, ceil( ) may round up the result of the quotient to an integer value. If $N_I$ is not an integer multiple of $2^L$, then the last column is partially filled during the frequency interleaving process. The number of data subcarriers, C, in the last column is given by:

$$C = N_I - 2^L(K-1)$$

The system circuitry 114 that implements the frequency interleaver may implement the following processing logic. For sake of discussion, rows are numbered 0 to $2^L-1$, and columns are numbered from 0 to K-1.

The system circuitry 114 that implements the frequency interleaver may write data for successive consecutive subcarriers into the subcarrier matrix 164 according to a function output of a memory address. For instance, the frequency interleaver may write successive consecutive subcarriers into the row of the subcarrier matrix 164 given by the L-bit cyclic redundancy check (CRC) value of a L-bit row address, for example as described in greater detail below in accordance with FIGS. 5 and 6.

The system circuitry 114 that implements the frequency interleaver may rotate the subcarriers in each row of the subcarrier matrix 164 written by the same L-bit CRC value of the row address modulo the number of columns in that row (modulo K for a row below C or modulo K-1 for row C and higher), for instance using a right circular shift. Rotation of data in the subcarrier matrix 164 may be accomplished by any suitable technique, such as physically moving stored data among storage locations or changing the addressing or indexing of the stored data in the subcarrier matrix.

Figure 2:
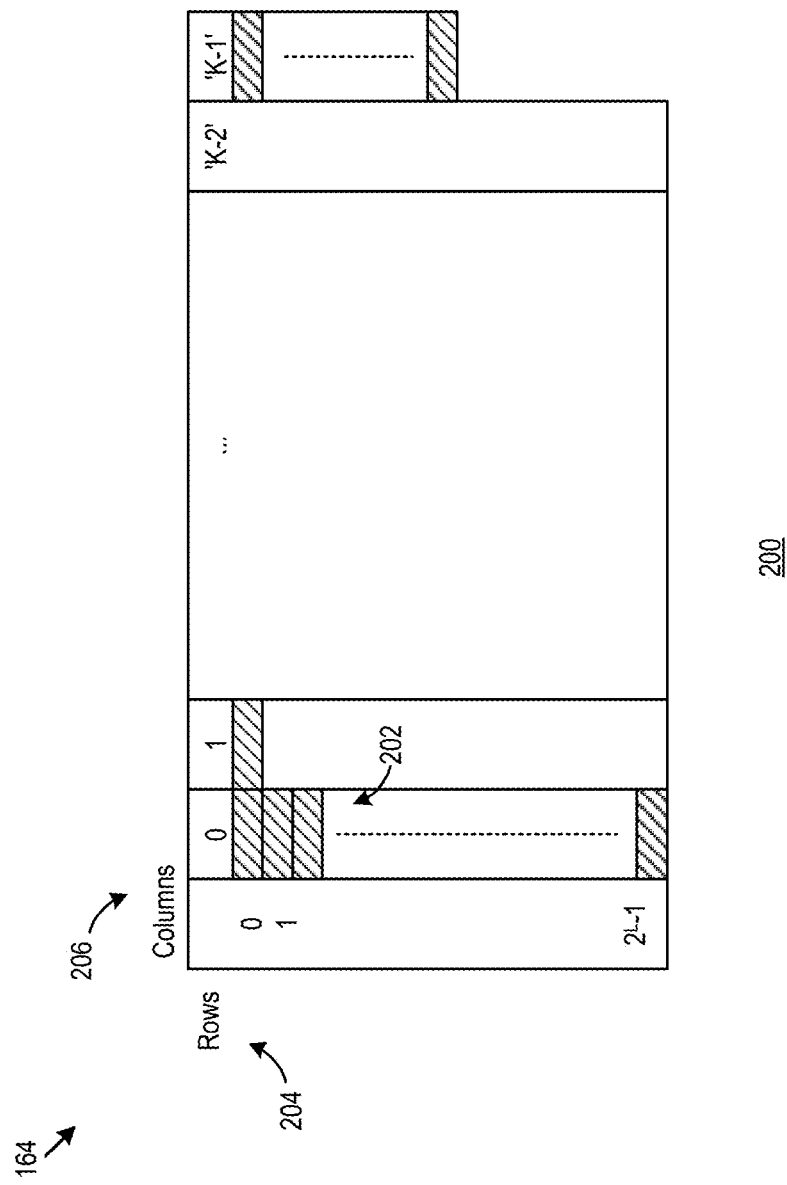
FIG. 2 is an example of a memory that stores subcarrier identifiers.

FIG. 2 shows an example of a memory 200 that stores subcarriers. The memory 200 may be a part of the memory 120 of the system 100 of FIG. 1, for example, and may be accessible by the system circuitry 114. The memory 200 stores subcarrier matrix 164. The subcarrier matrix 164 stores subcarriers 202 in rows 204 (e.g., $2^L$ rows) and columns 206 (e.g., K columns).

After storing the subcarrier data in the subcarrier matrix 164, the system circuitry 114 that implements the frequency interleaver may rotate the subcarrier data in each column by the L bit CRC value of [K-1 minus the column address], for instance using a downward circular shift. Note that the last column K-1 with a CRC value of 0 need not be rotated. In one example, the CRC of each row is determined. By taking the CRC value of each row, the rows are filled in generally random order.

Figure 3:
FIG. 3 shows an example of a subcarrier rotation for a horizontal row that the frequency interleaver may perform.

FIG. 3 illustrates a portion of the memory 200 of FIG. 2. FIG. 3 shows an example of a subcarrier rotation 300 for a horizontal row that the frequency interleaver may perform, e.g., a row rotation by 2 for a row of 128 columns. Each address location stores a value corresponding to a subcarrier identifier. Each entry on the illustrated row is shifted to the right by 2 address locations.

Figure 4:
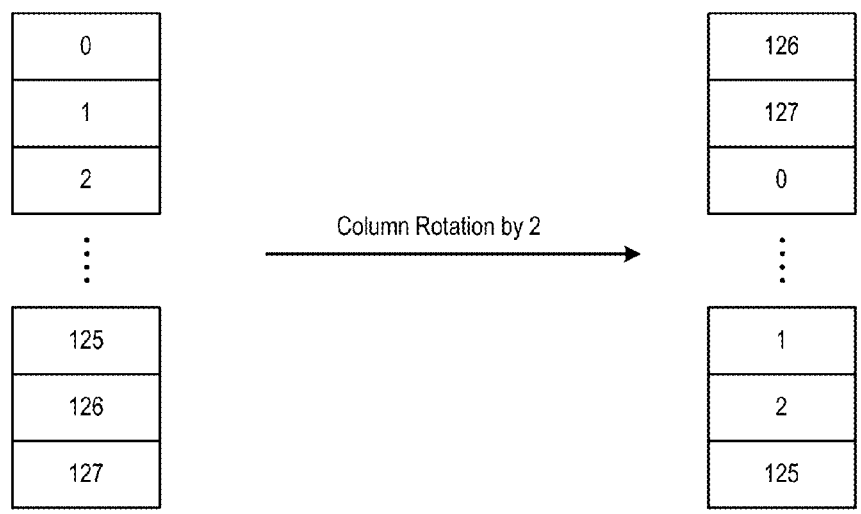
FIG. 4 shows an example of a subcarrier rotation for a vertical column that the frequency interleaver may perform.

FIG. 4 illustrates a portion of the memory 200 of FIG. 2. FIG. 4 shows an example of a subcarrier rotation for a vertical column that the frequency interleaver may perform. In the example, a column rotation by two is performed for a column of 128 rows.

Frequency interleaving in these exemplary embodiments may be accomplished by using a row rotation in combination with a column rotation. In one embodiment, the system circuitry 114 that implements the frequency interleaver may write data for successive consecutive subcarriers into the subcarrier matrix 164. As noted for the example, the subcarrier matrix 164 is a two-dimensional store and data may be written row-wise from column 0, row 0 to column K−1 to row C in the interleaved output row address given by the L bit CRC value of the input row address. Subsequently, the system circuitry 114 that implements the frequency interleaver may rotate the subcarriers in each row by the L bit CRC value of the row address modulo the number of columns in that row. This may be either modulo K for a row below C or modulo K−1 for a row C and higher. This is done using a right circular shift, as illustrated in FIG. 3. Subsequently, the system circuitry 114 that implements the frequency interleaver may rotate the subcarriers in each column by the L bit CRC value of [K−1 minus the column address] using a downward circular shift. The last column K−1 with a CRC value of 0 is not rotated. Subsequently, to transmit a symbol, the system circuitry 114 that implements the frequency interleaver may read the subcarriers out of the subcarrier matrix 164, for example column-wise from row 0, column 0 to row C−1, column K−1. Other rotations may be used to perform the interleaving operation.

Note that in the exemplary processing logic above, the input subcarriers of the OFDM symbol may be initially arranged into the subcarrier matrix 164 in sequential order row-wise from row 0, column 0 to row $2^L$, column C. The above processing logic may relocate each sequential input subcarrier number in row r, column c into a permuted output subcarrier number in the subcarrier matrix 164 in that the position in row r, column c is sc(r,c) given by:

$$sc(r, c) = sc_0[(r - CRC(K-c)) \bmod 2^L] + (c - (r - CRC(K-c)) \bmod 2^L) \bmod M,$$

where $$M = \begin{cases} K, & \text{for } (r - CRC(K-c)) \bmod 2^L < C \\ K-1, & \text{otherwise} \end{cases}$$

The matrices sc(r,c) ∈ [0, 1, . . . , $N_f$−1] and $sc_0$[n] may be defined as an array of $2^L$ elements where each element contains the cumulative number of subcarriers previously written into the subcarrier matrix 164 prior to writing input row n into the permuted output row (e.g., the CRC value of the input row address), and may represent the starting (e.g., lowest) subcarrier number in a permuted row. Note that if the last column contains fewer subcarriers than $2^L$, the cumulative value in $sc_0$[n] may take into account those previously written permuted output rows that were shorter by one subcarrier (e.g., those prior row addresses that were greater than or equal to C, the number of subcarriers in the last column).

Accordingly, the system and method illustrated here provide efficient frequency interleaving operation with substantial benefits over conventional devices. Memory storage requirements may be small in that the frequency interleaving process may not require a large subcarrier matrix lookup table. A 128×128 matrix is illustrated in the present example. This beneficially reduces memory and storage requirements in implementation. Further, the frequency interleaving process may also be performed through direct calculations. Thus, the interleaving process does not require a variable number of clock cycles.

Cyclic Redundancy Check

Figure 5:
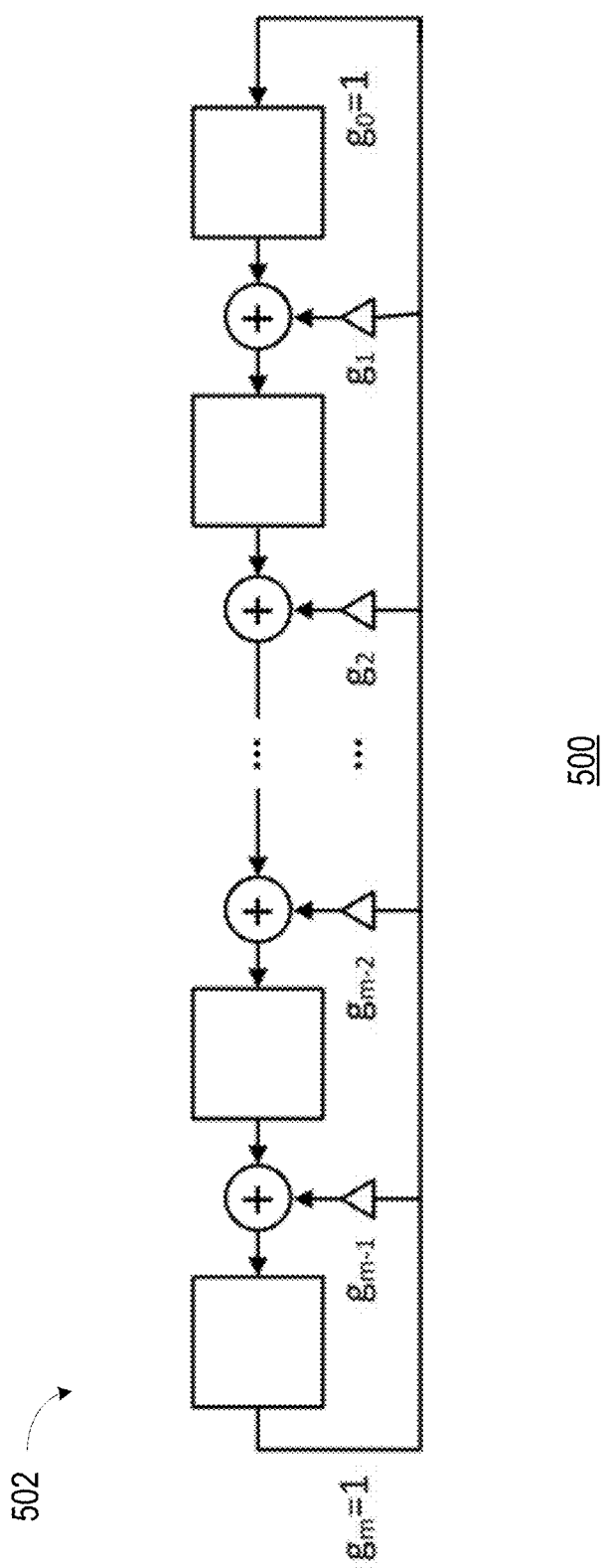
FIG. 5 is an example of a linear feedback shift register (LFSR) that calculates a cyclic redundancy check value that, for instance, is used to determine a row address into a memory.
Figure 6:
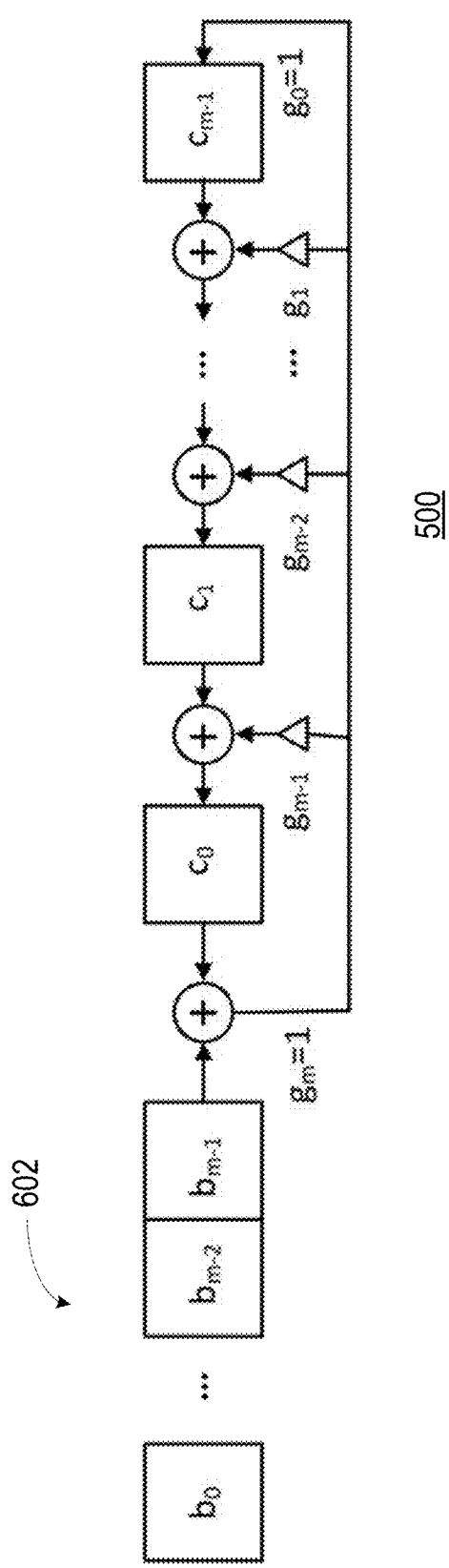
FIG. 6 shows an example of a calculation of a cyclic redundancy check value using the LFSR structure of FIG. 5.

FIG. 5 shows an example of a linear feedback shift-register 500 that calculates a CRC in FIG. 6. The linear feedback shift register (LFSR) 500 may include m-number of stages 502. The LFSR 500 may operate to calculate the CRC of a row address, for example a row address of the subcarrier matrix 164 described in conjunction with FIGS. 1 and 2. The LFSR 500 may be implemented in hardware, software, or any suitable combination of the two. The LFSR 500 may be implemented, configured, or defined using a generator polynomial of degree m=L in the finite (Galois) field GF[2]:

$$G(X) = g_m X^m + g_{m-1} X^{m-1} + g_{m-2} X^{m-2} + \ldots + g_2 X^2 + g_1 X^1 + g_0$$

where the coefficients $g_m$ corresponding to the feedback taps of the LFSR 500 may be configured such that the resulting generator polynomial is primitive, for instance, if the polynomial is prime and cannot be factored, and if it is a factor that evenly divides $X^N + 1$, where $N = 2^m - 1$. This may guarantee that each L bit address for the $2^L$ rows is unique and the CRC values span the entire set of the $2^L$, L-bit addresses.

FIG. 6 shows an example of calculation 600 of a CRC using the LFSR 500 of FIG. 5. A row address 602, in which the order of the bits of the address has been reversed, is the input to the LFSR 500. The output data from the LFSR 500 is a CRC value for the row address 602. In FIG. 6, the calculation of the CRC $c_{m-1}, c_{m-2}, \ldots, c_1, c_0$ for a row address 602 defined as $b_{m-1}, b_{m-2}, \ldots, b_1, b_0$ using the LFSR 500 is shown.

In other embodiments, the CRC generator may be implemented using only logic gates such as exclusive-OR gates, in place of the LFSR. In still other embodiments, a pseudo-random number generator may be used to randomize the data.

Use of CRC for filling in rows of the store is desirable because the hardware for implementing a CRC generator is relatively simple to implement and requires relatively little circuitry or memory. In some techniques, merely bit-reversing the row address to randomize the data may be adequate. However, applying the CRC generator to the row address improves the relative randomness of the frequency interleaving, spreading the subcarrier frequencies more randomly throughout the transmit spectrum and thereby improving resistance to interference that affects a portion of the spectrum. Forward error correction techniques permit recovery of a transmitted symbol with high reliability.

Thus, a process for filling the memory 200 may include several randomizing steps. First, a CRC address write is used to randomize which row is used to begin writing received data. Second, a circular shift or rotation is done in each row during writing using a shift index or number of columns to shift the selected row. Thus, if a first row is to be written at location 0, the data is written across the row from location 0 to location 127. If the next row is to be written starting at location 16, for example, the first element is written at location 16 followed by subsequent elements up to location 127. Writing then wraps around the same row and data is written at location 0, ending at location 15. This ensures there is little or no periodicity remaining in the data in the memory from the original data. When reading data column-wise from the memory 200, a circular column shift is done as well, using a different shift index. The read data forms the symbol to be transmitted.

Frequency De-Interleaving

The system circuitry 114 may implement a frequency de-interleaver. De-interleaving may be accomplished by generally reversing the interleaving process described above, for example. A symbol to be de-interleaved may include $N_I$ subcarriers indexed from 0 to $N_I-1$, which may be in ascending frequency order. The input subcarriers of the interleaved OFDM symbol may be arranged into the $2^L$ row by K column subcarrier matrix 164 (FIG. 1) in sequential order column-wise from row 0, column 0 to row C−1, column K−1. As the symbol data is received by a transceiver of the transceivers 134 of the system 100, the symbol data is written into the subcarrier matrix 164 by the system circuitry 114. The frequency de-interleaver may write the subcarriers into the subcarrier matrix 164 column-wise from column 0, row 0 to column K−1, row C.

The system circuitry 114 which implements the frequency de-interleaver may implement the following processing logic to reverse the interleaving process and thereby de-interleave the subcarriers of the symbol. For sake of discussion, rows of the subcarrier matrix 164 are numbered 0 to $2^L-1$, and columns are numbered from 0 to K−1.

The system circuitry 114 which implements the frequency de-interleaver may rotate the subcarriers in each column by the L bit CRC value of [K−1 minus the column address], for example using an upward circular shift that is the reverse of the exemplary rotation shown in FIG. 4. Note that the last column K−1 with a CRC value of 0 need not be rotated. Rotation of data in the subcarrier matrix 164 may be accomplished by any suitable technique, such as physically moving stored data among storage locations or changing the addressing or indexing of the stored data in the subcarrier matrix.

Subsequently, the system circuitry 114 which implements the frequency de-interleaver may rotate the subcarriers in each row of the subcarrier matrix 164 written by the same L bit CRC value of the row address modulo the number of columns in that row (either modulo K for a row below C or modulo K−1 for row C and higher), for example using a left circular shift that is the reverse of the exemplary rotation shown in FIG. 3.

The frequency de-interleaver may then read the data defining the subcarriers out of the subcarrier matrix 164 row-wise in the row order given by the L bit CRC value of each sequential L bit row address. This may include skipping the last column at or beyond row C.

64-Point Subcarrier Example

Figure 7:
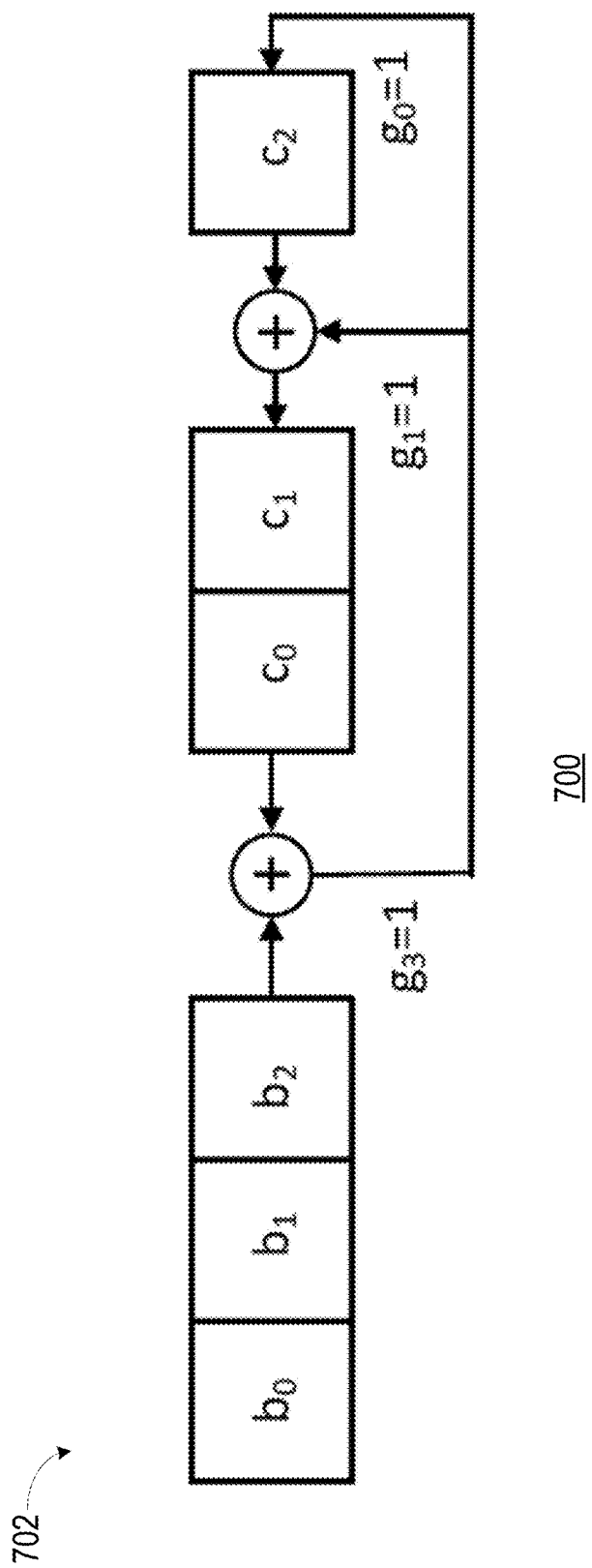
FIG. 7 shows an example cyclic redundancy check address generator that includes a LFSR structure.

FIG. 7 shows an example CRC address generator 700 that includes a LFSR 702. The CRC address generator 700 may include a 3-stage LFSR 702 for calculating the CRC of a row address. The LFSR 702 may be implemented in hardware, software or any suitable combination of hardware and software. In this example, the LFSR 702 may be defined using a primitive generator polynomial of degree 3:

$$G(X) = X^3 + X^1 + 1$$

Figure 8:
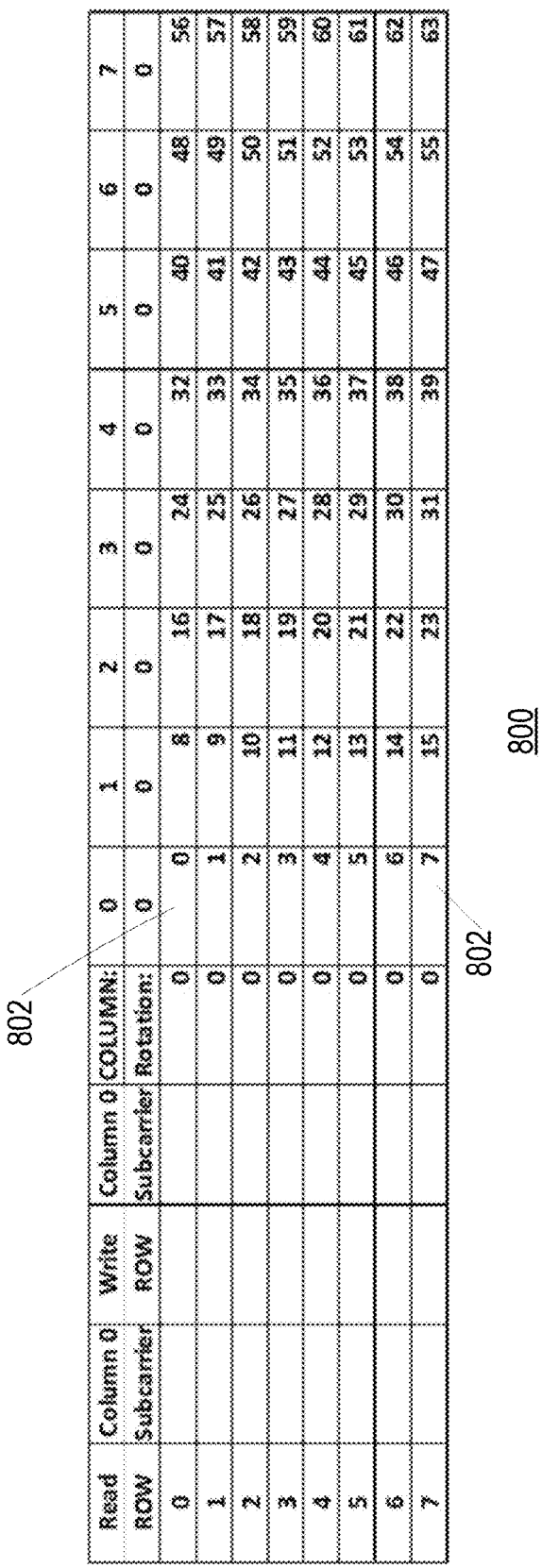
FIG. 8 shows an example of data that may be generated during a frequency interleaving process.

The CRC address generator 700 may receive an input sequential row address $b_2$, $b_1$, $b_0$. In response to the input sequential row address, the CRC address generator 700 may generate as output data a permuted row address as the CRC value $c_2$, $c_1$, $c_0$. FIG. 8 shows the non-interleaved subcarrier order column-wise. FIGS. 9-11 show exemplary different states of information throughout the interleaving process, including different states of the subcarrier matrix 164.

FIGS. 9 through 11 show examples data storage and manipulation for frequency interleaving for OFDM modulation. FIG. 8 illustrates a subcarrier matrix 800 into which subcarrier data for 64 subcarriers have been written. For an example with 64 subcarriers, a matrix with eight rows and eight columns provides space for storage of the subcarrier data. FIG. 8 shows an example of data for non-interleaved subcarriers.

Initially, subcarriers for an OFDM symbol are processed lowest frequency to highest frequency. The data are contained or represented as a single column with 64 row entries for each OFDM symbol. In the non-interleaved case, the subcarrier data are then written as a two-dimensional block, subcarrier matrix 800. If interleaving was not done, the matrix can be any arbitrary size. However, in accordance with examples herein, the OFDM subcarrier data is written to a generally square matrix such as subcarrier matrix 800. The data may be written into storage locations of a memory by a processor or other hardware device.

The subcarrier data in this example is written along consecutive columns, starting at the upper left, row 0, column 0, designated location 802 in FIG. 8, and proceeding down column 0 until all column entries are filled at location 804. The entry in each matrix location indicates which subcarrier, numbered from 0 to 63, is stored in that matrix location. After column 0 is filled, column 1 is filled from row 0 to row 7. The process of writing subcarrier data continues filling the subcarrier matrix column-wise with data.

FIG. 9 shows an example of data storage in conventional row-column (systematic) block interleaving. FIG. 9 illustrates a subcarrier matrix 900 into which subcarrier data for 64 subcarriers has been written. FIG. 9 illustrates a portion of the subcarrier interleaving technique described herein. In the example of FIG. 9, the data are written a row at a time. The subcarrier number whose data is stored in a respective matrix location in the subcarrier matrix 900 is shown as the number in that location. As part of the frequency interleaving process, successive subcarrier data is written into the subcarrier matrix 900. The data is written row-by-row, starting with subcarrier 0 at location 902 at row 0, column 0 on the upper left and proceeding across row 0 until row 0 is filled with subcarrier 7 at location 904. Writing of data then proceeds to row 1, column 0. Data is written in this fashion until the subcarrier matrix is filled or the input subcarrier data is exhausted.

When the data are read out from the subcarrier matrix 900, the data is read column-by-column. Thus, the data from location 902 is read first, or subcarrier 0. The next entries read, along the column of location 902, are subcarriers 8, 16, 24, 32, 40, 48 and 56. Readout then continues at the top of column 1, with subcarriers 1, 9, 17, and so on, until all subcarrier data have been read from the subcarrier matrix 900.

The effect of this row-column interleaving is to space the subcarriers apart by a factor of 8. Subcarriers that are adjacent in frequency become separated by other non-adjacent subcarriers when the subcarriers are read out of the subcarrier matrix 900. This achieves a systematic interleaver. In the event of a burst error, the errors to the subcarriers would be separated in frequency by a factor of eight. For example, if a burst of interference affects one column of the subcarrier matrix 900, affecting all members of a column, the errors would be dispersed over a broad frequency of spectrum because of the interleaving. A code word spanning 16 subcarriers would, in this example, have only two errors instead of eight errors in the non-interleaved case. However, if noise or interference is periodic in nature, in this case with a periodicity of 8, the interference will all affect one code word. The interleaving in the case of FIG. 9 is not randomized, it is systematic.

FIG. 10 shows an example of data after a CRC row address write and rotate. FIG. 10 illustrates a subcarrier matrix 1000 into which subcarrier data for 64 subcarriers has been written. Initially, the data has been written row-wise and, after processing, will be read column-wise. In this example, rather than writing and reading sequentially from the subcarrier matrix 1000, the rows of data are written to a location given by the CRC of the row address.

For example, a CRC generator, such as the CRC generator 700 of FIG. 7 may be used to generate CRC data from an input row address. Initially, the CRC generator stores and provides as output data all 0 values. If a row address of ($b_2$, $b_1$, $b_0$) of value (0, 0, 0) is provided to the CRC generator, the output is (0, 0, 0) since the CRC value of (0, 0, 0) is likewise (0, 0, 0). In the case of row 1, having an address of (0, 0, 1), the CRC generator receives an input of (1, 0, 0) and produces an output value of ($c_2$, $c_1$, $c_0$) of (1, 1, 0). Therefore, row 1 maps to row 6 of the subcarrier matrix 1000.

These results are indicated in FIG. 10. Read row 0 location 1002 maps to write row 0 location 1004. Read row 1 location 1006 maps to write location 1008.

FIG. 11 shows an example of data after a CRC row address write and rotate plus a column rotate. Thus, there is a one-to-one mapping of the nominal row address to the CRC value of the row address, which is the row of the subcarrier matrix 1000 which is actually written.

Thus, during the writing process, initially row 0 is written with subcarriers 0, 1, 2, 3, 4, 5, 6, 7. Next, the nominal read row 1 is written, but this is mapped to write row 6. Therefore, row 6 is written with carriers 8 through 16.

In some embodiments, not only is the row designated by the CRC value of the read row selected as the write row, in addition, a rotation shift on the write location is performed. Thus the next subcarrier to be written is written to column 6, which is a shift from the last-written column, 0, by the CRC amount, 6. This is indicated in FIG. 10 as a row rotation by 6 in matrix location 1010 and the data for subcarrier 8 is written at location 1012. This process continues for the remaining subcarrier data, for a total of 64 subcarrier values in this example.

One effect of the operation illustrated in FIG. 10 is to break up the systematic periodicity (every 8 columns) described above in conjunction with FIG. 9. In the example of FIG. 10, by applying the CRC value of the read row address to the row address and by using the CRC value of the read row address as a column shift value, the relative positioning of the subcarriers is pseudo-randomized.

FIG. 11 shows an example of data that may be generated during a frequency interleaving process. FIG. 11 illustrates processing that may be done as part of the write process. FIG. 11 illustrates a subcarrier matrix 1100 into which subcarrier data for 64 subcarriers has been written.

The populated subcarrier matrix 1100 generated from subcarrier matrix 1000 is used during reading from the subcarrier matrix 1100 to transmit the subcarriers. Initially, a column rotate is performed on the reverse-ordered (descending order) column address during readout of the data.

Thus, column 7 becomes column 0, as indicated at column rotation designators 1102 and 1104. The CRC of (0, 0, 0) is ($c_2$, $c_1$, $c_0$) of (0, 0, 0). Column 6 is mapped to column 1 and column 1 gets a CRC of 6. The write rows, 0, 6, 3, 5, 7, 1, 4, 2 are ordered as shown by element 1106 in FIG. 11. This information corresponds to the rotational shift performed when reading out the rows. Thus, the column rotation as indicated by element 1108 is the reverse, or 2, 4, 1, 7, 5, 3, 6, 0. This number corresponds to the rotational shift performed when reading out the rows of the subcarrier matrix 1100. Thus, in FIG. 10, column 1014, with subcarrier values 0, 47, 62, 21, 52, 27, 10, 33, is shifted by two so that in FIG. 11, column 1110 contains the same values, shifted down from row 0 to row 2, wrapping around to row 0. Column 1110 includes values of 10, 33, 0, 47, 62, 21, 52, 27. Also, in this example, the last column, column 7 in FIG. 11, is not rotated so its order is not changed during this step.

During readout, these are the initial subcarrier values read from the subcarrier matrix. For readout, the data may be read in column order. In effect, this pseudo-randomly reorders the subcarriers to achieve frequency interleaving in a random manner, or at least a pseudo-random manner. However, the illustrated technique is predictable and reversible so that on de-interleaving, the carriers may be reassembled into the initial order illustrated in FIG. 9. Further, the illustrated technique is simple and efficient to implement in hardware.

EPoC Frequency Interleaver Example

Figure 12:
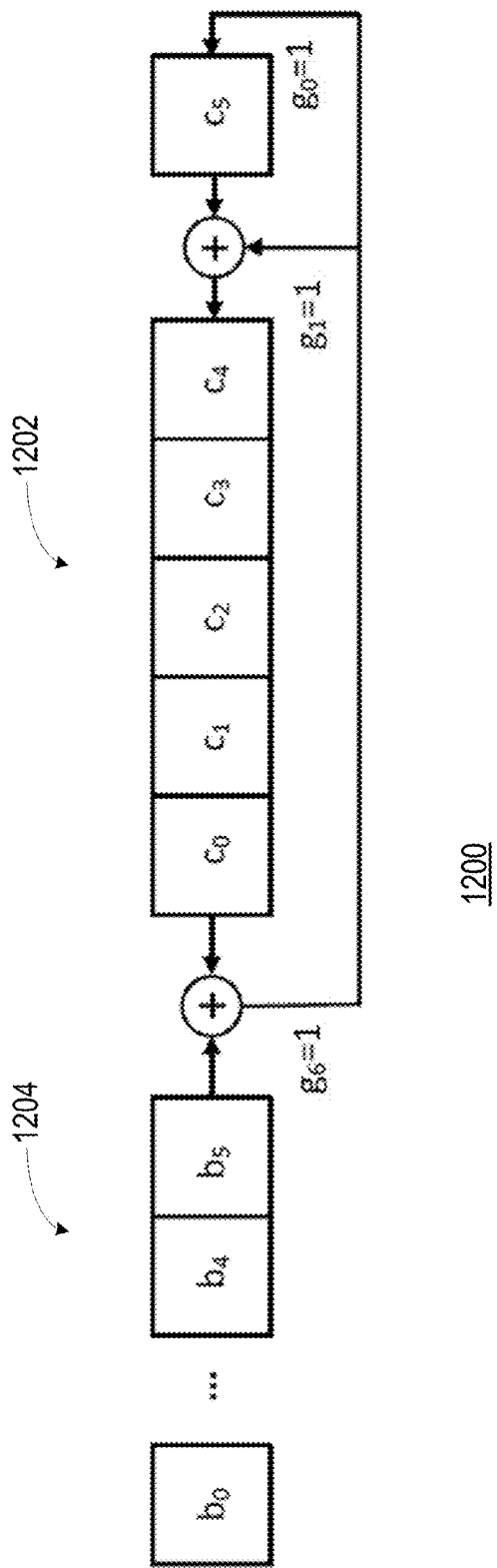
FIG. 12 shows an example cyclic redundancy check address generator that includes a LFSR structure.

FIG. 12 shows an example CRC address generator 1200 that includes a LFSR 1202. The CRC address generator 1200 may be suitable for frequency interleaving in a system implementing an Ethernet passive optical network (EPON) protocol over coax, or EPoC. Such a network may include equipment function according to Institute of Electrical and Electronics Engineers (IEEE) standard 802.3.

In FIG. 12, the CRC address generator 1200 may include a 6-stage LFSR 1202 for calculating the CRC of a row address. In this example, the LFSR 1202 may be defined using a primitive generator polynomial of degree 6 such as the following:

$$G(X)=X^6+X^1+1$$

The CRC address generator 1200 may receive a row address 1204 designated as $b_5$, $b_4$, $b_3$, $b_2$, $b_1$, $b_0$. A nominal input address has the form ($b_5$, $b_4$, $b_3$, $b_2$, $b_1$, $b_0$). Before application to the LFSR structure 1202, however, the bits are ordered most significant bit first to the form ($b_0$, $b_1$, $b_2$, $b_3$, $b_4$, $b_5$). The CRC address generator 1200 may generate as output data a row write address as the CRC value $c_5$, $c_4$, $c_3$, $c_2$, $c_1$, $c_0$. The CRC address generator is used to generate address values and shift values in accordance with the examples above.

FIG. 13 shows an example of partial data generated during the interleaving process. These data are produced as a result of application of the process illustrated herein a system operation according to the IEEE 802.3 standard for EPoC. In such an example, the OFDM symbols are modulated with 3745 subcarriers. The subcarriers are interleaved as described above into a subcarrier matrix 1300. The subcarrier matrix 1300 has 64 rows and 59 columns. The final column has only 33 elements. Only 16 rows and 9 columns of the total matrix 1300 are shown in FIG. 13.

Further, as noted above the above processing logic used to form the subcarrier matrix may be simplified to a direct calculation of data. A processor or other device, implementing a frequency interleaver for OFDM symbols in an IEEE 802.3 system, may relocate each sequential input subcarrier number in row r, column c into a permuted output subcarrier number in the subcarrier matrix 1300 in that the position in row r, column c is sc(r,c) given by:

$$sc(r, c) = \\ sc_0[(r - CRC(K - c)) \bmod 2^L] + (c - (r - CRC(K - c)) \bmod 2^L) \bmod M,$$

where $$M = \begin{cases} K, & \text{for } (r - CRC(K - c)) \bmod 2^L < C \\ K - 1, & \text{otherwise} \end{cases}$$

sc(r,c) ∈ [0, 1, . . . , $N_f$–1] and $sc_0$[n] may be defined as an array of $2^L$ elements 1302 where each element contains the cumulative number of subcarriers previously written into the subcarrier matrix 1300 prior to writing input row n into the permuted output row (e.g., the CRC value of the input row address), and may represent the starting (e.g., lowest) subcarrier number in a permuted row. The array $sc_0$(n), where n goes through every row, is an array of $2^L$ elements. It carries the cumulative number of subcarriers previously written into the two dimensional store. The array $sc_0$(n) operates to accommodate a two dimensional store in which the final column is not full, such as subcarrier matrix 1300 which has only 33 elements in the final column, the value C in the relation above.

The disclosure above may provide for a random (non-systematic) frequency interleaver and de-interleaver. The interleaving process may use the CRC value of each L bit row input address for row write address permutation. The rotation of rows, columns, or both may prevent or reduce periodicity, which may result in pseudo-random sub-carrier frequency dispersion or non-systematic random ordering of subcarriers across an entire spectrum. Accordingly, the disclosure may provide for a low complexity implementation of frequency interleaving and avoid use of a large lookup table by using direct calculation. Direct calculation may also provide the benefit of avoiding or reducing time varying address generation.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A communication device comprising:
   a transceiver for data communication in a transmission spectrum over a channel;
   a memory; and
   system circuitry in data communication with the memory and the transceiver, the system circuitry configured to format data symbols for transmission by the transceiver over the channel, the system circuitry configured to:
   receive data for transmission over the channel;
   modulate respective subcarriers of a plurality of subcarriers with the data to define subcarrier data;
   store the subcarrier data in a subcarrier matrix in the memory in a pseudo-random order, including applying a row rotation of subcarriers in the subcarrier matrix and a column rotation of the subcarriers in the subcarrier matrix to substantially randomize location of the respective subcarriers across the transmission spectrum when the subcarrier data is read from the subcarrier matrix; and
   provide the subcarrier data from the subcarrier matrix to the transceiver for generation of the respective subcarriers and communication of the respective subcarriers on the channel.

2. The communication device of claim 1 wherein the system circuitry comprises:
   a linear feedback shift register operative to determine the pseudo-random order for storage of the subcarrier data in the subcarrier matrix.

3. The communication device of claim 2 wherein the linear feedback shift register is configured to determine a cyclic redundancy check (CRC) value for a bit row address and wherein the system circuitry is configured to write the subcarrier data into a row of a two dimensional array given by the CRC value.

4. The communication device of claim 3 wherein the system circuitry is further configured to rotate the subcarrier data along rows of the subcarrier matrix or along columns of the subcarrier matrix, or both, to substantially randomize location of the respective subcarriers across the transmission spectrum when the subcarrier data is read from the subcarrier matrix.

5. The communication device of claim 3 wherein the system circuitry is further configured to rotate the subcarrier data along respective rows of the subcarrier matrix using a respective CRC value of a row address for the respective row of the subcarrier matrix.

6. The communication device of claim 5 wherein the system circuitry is further configured to rotate the subcarrier data written into respective columns of the subcarrier matrix using a CRC value of [K−1 minus a column address for the respective column], where K is a number of columns in the subcarrier matrix.

7. The communication device of claim 1 wherein the transceiver is configured to receive data over the channel, the data modulating respective receive subcarriers of a plurality of receive subcarriers, the respective subcarriers interleaved among a reception spectrum, and wherein the system circuitry is further configured to de-interleave the plurality of receive subcarriers and demodulate the data.

8. The communication device of claim 1 wherein the transceiver is operative according to Institute of Electrical and Electronics Engineers (IEEE) Ethernet passive optical network (EPON) protocol over coax (EPoC) standard 802.3.

9. A method comprising:
at a data communication device,
receiving data symbols to be transmitted over a channel;
frequency interleaving the data symbols to be transmitted, including
writing frequency subcarrier identifiers into a memory in a pseudo-random order as a two dimensional array having a plurality of rows and a plurality of columns, the subcarrier identifiers identifying respective subcarriers of a plurality of subcarriers to be modulated with data to be transmitted, including:
rotating subcarrier identifiers of the two-dimensional array along one or more rows of the plurality rows, and
rotating subcarrier identifiers of the two-dimensional array along one or more columns of the plurality of columns; and
determining frequency subcarriers for transmitting the symbols by indexing into the memory.

10. The method of claim 9 further comprising:
determining the pseudo-random order using a linear feedback shift register (LFSR).

11. The method of claim 10 wherein determining the pseudo-random order comprises:
determining a cyclic redundancy check (CRC) value for a bit row address of the two-dimensional array; and
wherein writing the frequency subcarrier identifiers into the two dimensional array comprises writing the frequency subcarrier identifiers into a row of the two dimensional array given using the CRC value.

12. The method of claim 11 further comprising:
rotating the frequency subcarrier identifiers written into a respective row of the two dimensional array by a CRC value of a row address for the respective row modulo a number of columns in the respective row.

13. The method of claim 12 further comprising:
rotating the frequency subcarrier identifiers written into a respective column of the two dimensional array by a CRC value of [K−1 minus a column address for the particular column], wherein K is a number of columns in the two dimensional array.

14. A method comprising:
at a data communication device,
receiving data symbols to be transmitted over a channel;
frequency interleaving the data symbols to be transmitted, including
writing frequency subcarrier identifiers into a memory in a pseudo-random order as a two dimensional array, the subcarrier identifiers identifying respective subcarriers of a plurality of subcarriers to be modulated with data to be transmitted, the pseudo-random order being determined by:
using a linear feedback shift register (LFSR);
determining a cyclic redundancy check (CRC) value for a bit row address of the two-dimensional array; and
wherein writing the frequency subcarrier identifiers into the two dimensional array comprises writing the frequency subcarrier identifiers into a row of the two dimensional array given using the CRC value;
rotating the frequency subcarrier identifiers written into a respective row of the two dimensional array by the CRC value of the bit row address for the respective row modulo a number of columns in the respective row, using the CRC value of [K−1 minus a column address for the particular column], wherein K is a number of columns in the two dimensional array;
wherein the pseudo-random order comprises an ordering of the frequency subcarrier identifiers written in the two dimensional array read columnwise from row 0, column 0 to row C−1, column K−1 of the two dimensional array, wherein $C=N_I 2^L(K-1)$ and wherein $2^L$ is a number of rows in the two dimensional array and $N_I$ is the number of frequency subcarriers in the symbols to be transmitted, including data subcarriers and pilot placeholder subcarriers, and where C comprises a number of subcarriers and where the two dimensional array comprises $2^L$ rows; and
determining frequency subcarriers for transmitting the symbols by indexing into the memory.

15. The method of claim 14 wherein:
$K = \text{ceil}(N_I/2^L)$, where $N_I$ is the number of subcarriers in the symbols to be transmitted, including data subcarriers and pilot placeholder subcarriers, and where the function ceil( ) operates to round up to an integer value.

16. The method of claim 10 wherein the LSFR is defined using a generator polynomial of degree m =L in a finite (Galois) field GF[2]:

$$G(X) = g_m X^m + g_{m-1} X^{m-1} + g_{m-2} X^{m-2} + \ldots + g_2 X^2 + g_1 X^1 + g_0.$$

17. The method of claim 9, further comprising:
receiving over a communication channel a plurality of subcarriers modulated by data, the subcarriers being interleaved in frequency to substantially randomize location of respective subcarriers of the plurality of subcarriers across a communication spectrum of the communication channel;
de-interleaving the plurality of subcarriers, including:
writing subcarrier data defining the subcarriers into a two-dimensional matrix;

rotating the subcarrier data in each column of the two-dimensional matrix by a pseudo-random amount; and rotating the subcarrier data in each row of the two-dimensional matrix by a pseudo-random amount; and reading the subcarrier data from the two-dimensional matrix.

18. A method comprising:

at a data communication device, receiving input subcarrier numbers for data communication of an orthogonal frequency division multiplexed (OFDM) symbol over a channel;

storing respective input subcarrier numbers in sequential order in a two-dimensional subcarrier matrix in a memory device;

relocating each respective input subcarrier number in row r, column c of the subcarrier matrix into a permuted output subcarrier number in the subcarrier matrix at a position given by:

$$sc(r, c) = sc_0[(CRC(K-c))\mod 2^L] + (c - (r - CRC(K-c))\mod 2^L)\mod M,$$

-continued where $$M = \begin{cases} K, & \text{for } (r - CRC(K-c))\mod 2^L < C \\ K-1, & \text{otherwise} \end{cases}$$

where K is the total number of columns of the subcarrier matrix, C is the number of rows in the last column of the subcarrier matrix, and where $sc(r,c) \in [0, 1, \ldots, N_I-1]$ and $sc_0[n]$ is an array of $2^L$ elements, where each element contains the cumulative number of input subcarriers previously written into the subcarrier matrix prior to writing input row n into the permuted output row; and reading the subcarrier numbers from the subcarrier matrix to transmit the OFDM symbol over the channel.

19. The method of claim 18 wherein reading the subcarrier numbers from the subcarrier matrix comprises reading the subcarrier numbers from the subcarrier matrix columnwise from row 0, column 0 of the subcarrier matrix to row C−1, column K−1 of the subcarrier matrix.

20. A coaxial line terminal operative to implement the method of claim 18.

* * * * *